Nov. 15, 1966 R. R. STOKES 3,286,039

CALL TRANSMITTER

Filed Oct. 31, 1963 4 Sheets-Sheet 1

INVENTOR
R. R. STOKES
BY Harry L. Newman
ATTORNEY

United States Patent Office 3,286,039

Patented Nov. 15, 1966

3,286,039

CALL TRANSMITTER

Rembert R. Stokes, Indianapolis, Ind., assignor to Bell Telephone Laboratories, Incorporated, New York, N.Y., a corporation of New York Filed Oct. 31, 1963, Ser. No. 320,298
13 Claims. (Cl. 179—90)

This invention pertains to call transmitters and particularly to automatic call transmitters that employ a code bearing member having a plurality of digits encoded thereon.

Although not limited thereto the present invention is directed toward call transmitters of the type disclosed in the copending application of E. R. Andregg-W. Pferd-R. R. Stokes, Serial No. 193,267, filed May 8, 1962 and issued on June 15, 1965 as Patent No. 3,189,692. Call transmitters of this type include a plurality of switches that are actuated responsive to the coding on a code bearing member. The code bearing member is periodically advanced relative to the code switches, and each advancement of the code bearing member presents the coding representing a single digit and results in the actuation of individual ones of the code switches.

In addition to the plurality of code switches, the call transmitter includes a plurality of switches that are actuated in a particular sequence, the sequence of actuation being repeated for each advancement of the code bearing member. The plurality of code switches and the plurality of sequence switches are included in a switching matrix and when the actuated sequence switches match the actuated code switches, a path is provided through the switching matrix. Means are provided for transmitting signals out on a telephone line under the control of the switching matrix, and the provision of a path through the switching matrix is determinative of whether signals are or are not transmitted.

An object of this invention is to simplify call transmitters of this type.

This and other objects of this invention are achieved in an illustrative embodiment thereof wherein the call transmitter comprises a plurality of switches and means associated with each switch for detecting the coding on the code bearing member. The detecting means are normally spaced from the code bearing member, and means are provided for moving the individual detecting means toward the code bearing member in a particular sequence. Each detecting means is moved to a first position when no coding is detected thereby and moved to a second position when coding is detected thereby, and the switch with which each detecting means is associated is actuated only upon the movement of the detecting means to the second position. The plurality of switches are included in a switching matrix. and the actuation of two of the switches provides a path through the matrix that once provided is maintained throughout the remainder of the sensing sequence. A signal generating means operates in conjunction with the switching matrix and transmits pulses out on a telephone line when no path is provided through the switching matrix.

A complete understanding of the invention and these and other features and advantages thereof may be gained from consideration of the following detailed description taken in conjunction with the accompanying drawing wherein one embodiment of the invention is illustrated. It is to be expressly understood, however, that the drawing in for the purposes of illustration and description and is not to be construed as defining the limits of the invention.

*General description*

Figures 1, 2:
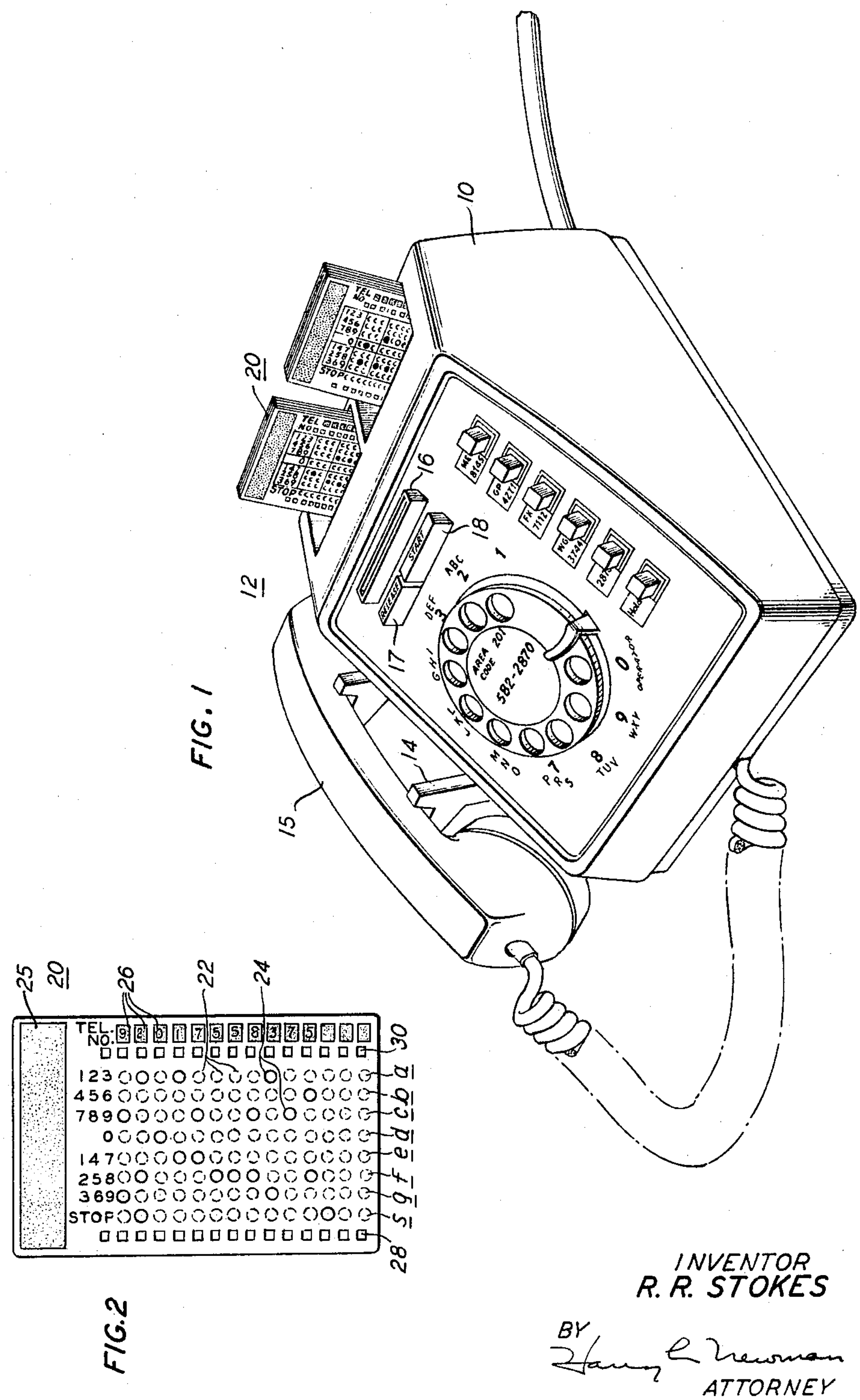
FIG. 1 is a perspective view of a telephone set including the automatic call transmitter of this invention.
FIG. 2 is a plan view of an encoded card that is employed in conjunction with the automatic call transmitter.

The call transmitter of the present invention is designed to supplement the manual dialing facilities of the ordinary telephone set by providing automatic means for dialing frequently called telephone numbers. As shown in FIG. 1, the automatic call transmitter is adapted to be incorporated in a deskstand 10 of a telephone set 12, the deskstand including a switchhook 14 on which a a handset 15 is normally positioned. An entryway 16, a release button 17, and a start button 18 of the call transmitter protrude through the faceplate of the deskstand 10 while encoded cards 20 used in conjunction with the call transmitter are stored in wells in the deskstand.

To operate the call transmitter, the subscriber selects a card 20 that is coded with the telephone number of the party he wishes to call, each card being coded to represent a single telephone number. The card 20 is placed in the entryway 16 and inserted to its full height. Next, the subscriber removes the handset 15 from the switchhook 14 and listens for a dial tone. Hearing one, he depresses the start button 18 and thereby initiates the operation of the call transmitter. During the operation of the call transmitter, the card 20 is stepped out of the entryway 16, and signals corresponding to the telephone number coded on the card are sent to the central office.

Upon completion of the operation of the call transmitter, it is disconnected from the circuit. Then just as in a conventional telephone, the subscriber must wait for the called party to answer, and while waiting, the subscriber may remove the card 20 from the entryway 16 and return the card to the wells in the deskstand 10.

As illustrated in FIG. 2, each card 20 comprises a rectangular planar member that is formed to include an array of removable discs 22 arranged in eight longitudinal columns and fourteen transverse rows. Each row of discs 22 is encodable to represent a single digit of a telephone number and is so encoded by removing selected ones of the discs to form one or two code holes 24 in the row, the discs being removed by pressing thereon with a pencil or similar instrument. For purposes of reference, the columns of discs 22 are identified in the drawing by the letters *a*, *b*, *c*, *d*, *e*, *f*, *g*, and *s* reading from right to left, and the particular columns in which code holes 24 are formed to represent the digits one through zero are as follows:

| Digit: | Columns in which code holes are formed |
|---|---|
| 1 | ae |
| 2 | af |
| 3 | ag |
| 4 | be |
| 5 | bf |
| 6 | bg |
| 7 | ce |
| 8 | cf |
| 9 | cg |
| 0 | d or none |

It is seen from the above that the digit zero will be transmitted if in a particular row no code holes 24 are formed or a code hole is formed in the column *d*. It is therefore apparent that in the call transmitter of this invention the forming of a code hole in the column *d* serves no function other than to permit the encoded card 20 employed in this invention to be also used in the call transmitters of a similar nature, such as the one disclosed in the above-identified patent application of E. R. Andregg-W. Pferd-R. R. Stokes.

To assist in the use of the card 20, an area 25 is provided at the top of each card for recording the name of the subscriber whose telephone number is to be encoded on the card, and a plurality of areas 26 are provided along one side of each card for recording the individual digits of the subscriber's telephone number, each digit area being in line with one of the rows of discs 22. Furthermore, groups of digits are printed above each of the columns *a* through *g* to indicate in which columns code holes 24 are to be formed to represent each of the digits.

With regard to the discs 22 in the column marked "stop," that is, the *s* column, one of these discs is removed from a particular row when it is desirable to stop the operation of the call transmitter subsequent to the dialing of the digit represented by the previous row. For example, when the call transmitter is being used in an office served by a private branch exchange, it is necessary to dial an initial digit to gain access to an outside trunk line and thereafter observe whether the trunk line is clear before the telephone number of the party to be called can be dialed. In such a situation, the disc 22 in the second row of the *s* column is removed. Then when the encoded card 20 is inserted into the entryway 16 and the start button 18 is depressed, the call transmitter will transmit signals corresponding to the first digit and stop. The calling subscriber will listen for a dial tone indicating that the trunk line is free, and hearing one, he will again depress the start button 18, causing the call transmitter to transmit signals corresponding to the remaining digits encoded on the card.

Another example of when it is desirable to stop the operation of the call transmitter is where a telephone number encoded on the card 20 is less than fourteen digits. The card 20 is provided with fourteen rows of removable discs 22 and is therefore capable of having a fourteen digit telephone number encoded thereon, a fourteen digit telephone number being the largest telephone number presently contemplated for use in the telephone system. Where the telephone number encoded on the card 20 is less than fourteen digits, a disc 22 is removed from the *s* column in the row following the last digit of the telephone number. Then, subsequent to the transmission of signals corresponding to the last digit, the operation of the call transmitter is stopped instead of having the call transmitter transmit the digit zero for the remaining rows of discs 22. Of course, stopping the call transmitter in this situation results in the card 20 remaining partially inserted into the entryway 16, and to remove the card it is necessary to depress the release button 17.

*Mechanical description*

Figure 3:
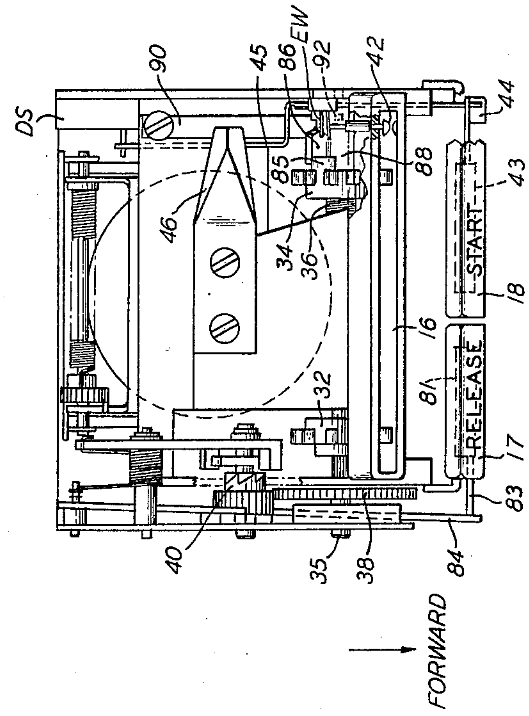
FIG. 3 is a top view of the automatic call transmitter separated from the telephone set with parts broken away for greater clarity.

Bordering the array of discs 22 in the card 20 is a pair of columns of sprocket holes 28 and 30, and when the card is inserted into the entryway 16, the columns of sprocket holes respectively engage the teeth on a pair of sprocket wheels 32 and 34 shown in FIG. 3. The sprocket wheels 32 and 34 are fixedly mounted on a rotatable shaft 35 and the interaction between the columns of sprocket holes 28 and 30 and the teeth on the sprocket wheels causes the sprocket wheels to be rotated in a forward direction.

A motor spring 36 disposed about the shaft 35 has one end thereof secured to the sprocket wheel 34 and the other end thereof held stationary, and the rotation of the sprocket wheels 32 and 34 results in the winding up of the motor spring and storage of energy therein. The motor spring 36 tends to rotate the sprocket wheels 32 and 34 in a rearward direction so as to move the card 20 out of the entryway 16. However, a gear 38 fixedly mounted on the shaft 35 couples the sprocket wheels to an escapement mechanism 40 that normally permits only forward rotation of the sprocket wheels and thereby normally acts to restrain the motor spring 36. The escapement mechanism 40 acting through the sprocket wheels 32 and 34 always locates the card 20 so that a row of discs 22 is presented to the means, hereinafter disclosed, for detecting the presence of code holes 24 in the card, the first row of discs being presented to the detecting means when the card is fully inserted into the entryway 16.

Figure 4:
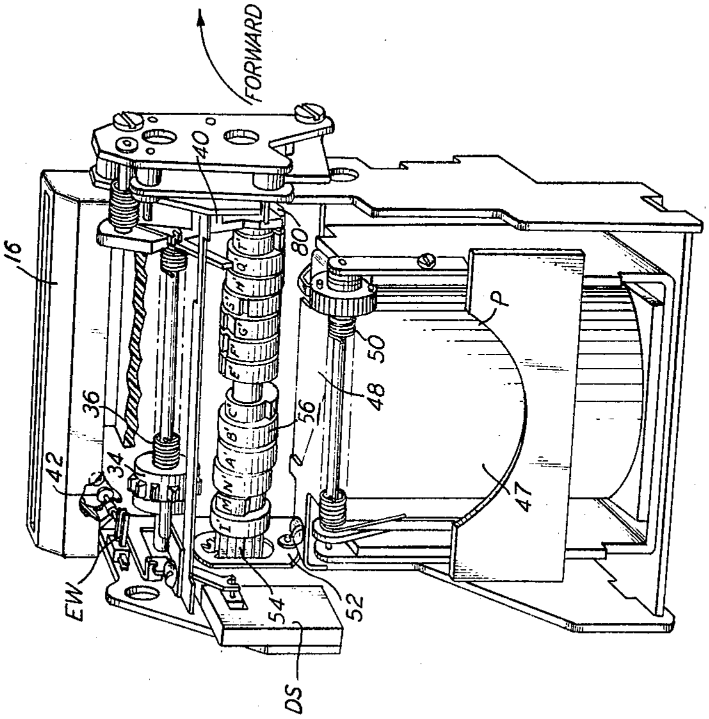
FIG. 4 is a rear perspective view of the automatic call transmitter with parts broken away for greater clarity.

In addition to winding up the motor spring 36, the insertion of the card 20 into the entryway 16 also closes a pair of normally open entryway contacts EW, the purpose of which is hereinafter explained. The entryway contacts EW are operated by an actuator 42 that extends into the entryway 16 and is therefore deflected by the insertion of the card 20 into the entryway. As shown in FIG. 4, the actuator 42 is located above the sprocket wheels 32 and 34 and thus it is deflected by the card 20 even though the card is disengaged from the sprocket wheels. Furthermore, the actuator 42 when in engagement with the card 20 rides on the surface underlying the digit areas 26, and as this surface is continuous, the actuator remains in a deflected condition throughout the travel of the card and until the card is removed from the entryway 16.

With the card 20 fully inserted into the entryway 16, the start button 18 is depressed. The start button 18 is mounted on a start plunger 43 that is slidably displaceable along a vertical plane between an upward and a downward position and is biased toward its upward position. The start plunger 43 includes a laterally extending flexible arm 44, and when the plunger is moved to its downward position, the arm interacts with a reciprocally movable start latch 45 to displace the latch rearwardly, a spring member 46 cooperating with the latch to maintain it in a rearward position once it is so displaced. The start latch 45 in moving to its rearward position operates a make-before-break dial start switch DS including a pair of normally closed contacts $DS_1$ (FIG. 9) and a pair of normally open contacts $DS_2$ to sequentially close the pair of normally open contacts $DS_2$ and then open the pair of normally closed contacts $DS_1$.

The start plunger 43 in moving to its downward position also actuates a make-before-break restart switch (not shown) including a pair of normally closed contacts $RS_1$ (FIG. 9) and a pair of normally open contacts $RS_2$ to sequentially close the pair of normally open contacts $RS_2$ and then open the pair of normally closed contacts $RS_1$. The contacts return to their normal condition in reverse sequence when the start button 18 is released and the start plunger 43 returns to its upward position.

In the usual situation, the actuation of the dial start switch DS initiates the operation of the call transmitter by energizing a coil 47 of a pulsing relay P, illustrated in FIG. 4. The pulsing relay P includes a pivotally mounted armature 48 that is movable between an upward and a downward position, the armature upon energization of the coil 47 being magnetically moved to its downward position and upon de-energization of the coil being mechanically moved to its upward position by a spring member 50.

The armature 48 in moving between its upward and downward positions operates a make-before-break pulsing switch (not shown) including a pair of normally closed contacts $P_1$ (FIG. 9) and a pair of normally open contacts $P_2$. The interaction between the armature 48 and the pulsing switch is such that the armature actuates the switch to sequentially close the normally open contacts $P_2$ and then open the normally closed contacts $P_1$ just shortly before the armature reaches its downward position. Similarly, the armature 48 actuates the pulsing switch to sequentially close the normally closed contacts $P_1$ and then open the normally open contacts $P_2$ thereof just shortly before the armature reaches its upward position.

The armature 48 in moving to its downward position also moves a pawl 52 coupled thereto into engagement with a ratchet wheel 54 to rotate the ratchet wheel in a rearward direction through one-fifteenth of a revolution. The interaction between the pawl 52 and the ratchet wheel 54 is such that the pawl moves the ratchet wheel through the major portion of its increment of rotation before the pulsing switch is operated. The ratchet wheel 54 is fixedly mounted on a shaft on which an encoded or programmed drum 56 is also fixedly mounted, and thus each energization of the pulsing relay P results in the rotation of the encoded drum through one-fifteenth of a revolution, fifteen energizations of the pulsing relay rotating the encoded drum through a complete revolution.

The encoded drum 56 comprises thirteen cams indicated by the reference characters I′, M′, N′, A′, B′, C′, E′, F′, G′, S′, H′, Q′, and T′. Each cam, like the cam C′ shown in FIG. 5, comprises one or more nonoperating portions 58 of small radius and one or more operating portions 60 of large radius. The leading edge of each nonoperating portion is joined to the trailing edge of an operating portion by a gradually ascending portion 62, and the leading edge of each operating portion is joined to the trailing edge of a nonoperating portion by a rapidly descending portion 64.

Figures 5, 7, 8:
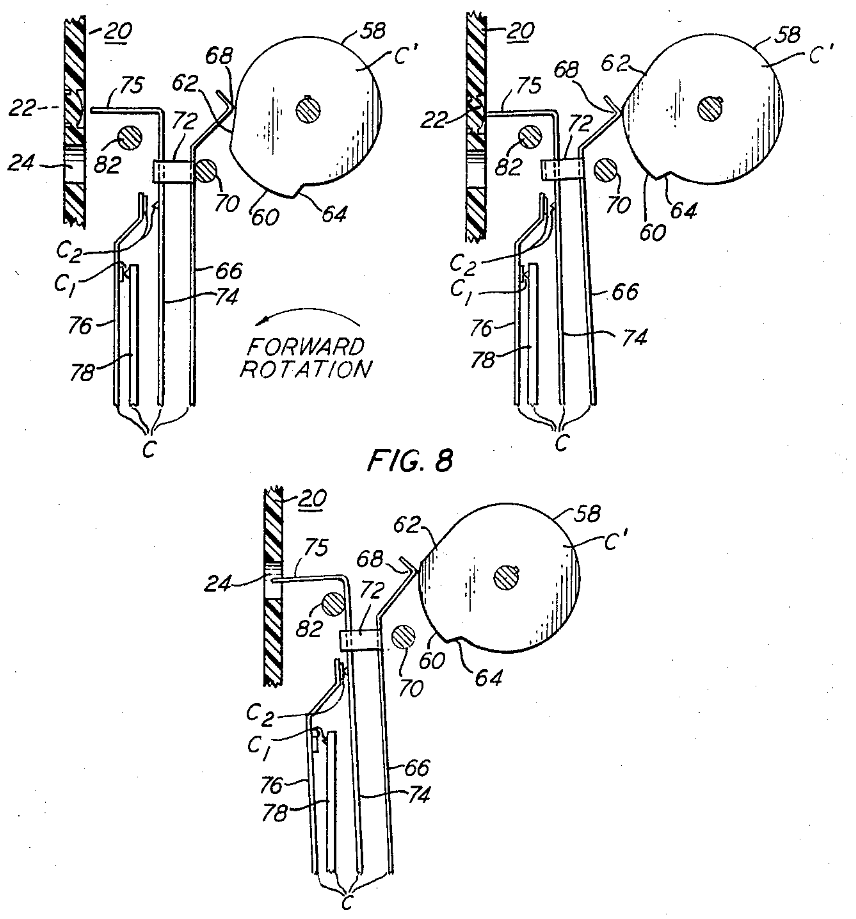
FIG. 5 is a side view showing the relationship between a code actuated sequence switch, the individual cam with which it is associated, and the encoded card when the cam is disengaged from the switch.
FIG. 7 is a side view showing the relationship between the code actuated sequence switch, its associated cam, and the encoded card when the cam is in engagement with the switch and an uncoded portion of the card is presented to the switch.
FIG. 8 is a side view showing the relationship between the code actuated sequence switch, its associated cam, and the encoded card when the cam is in engagement with the switch and an encoded portion of the card is presented to the switch.

Each of the cams I′, M′, N′, A′, B′, C′, E′, F′, G′, S′, H′, Q′, and T′ is associated with a switch having the same letter designation. The switches are basically the same, and therefore only the switch C associated with the cam C′ will be described in detail. It is seen in FIG. 5 that the switch C is mounted intermediate to the cam C′ and the card 20, the card having been inserted into the entryway 16 (FIG. 4). The switch C includes an actuator spring 66 which has a follower portion 68 that extends into juxtaposition with the cam C′, and the actuator spring is biased rearwardly toward the cam. However, in the normal condition of the actuator spring 66, which is when the nonoperating portion 58 of the cam C′ is presented to the follower portion 68, the actuator spring rests against a stop 70 that maintains the follower portion spaced from the cam.

The actuator spring 66 has a strap portion 72 that extends forwardly therefrom and then extends laterally in front of a flexible make contact spring 74. The make contact spring 75 includes a probe portion 75 that extends perpendicular to the card 20, and the sprocket wheels 32 and 34 (FIG. 3) and the escapement mechanism 40 cooperate to locate the card so that either a disc 22 or a code hole 24 in the *c* column (FIG. 2) of the array of discs is presented to the probe portion.

The make contact spring 74 is biased forwardly toward the card 20 and therefore tends to move into engagement with the strap portion 72 of the actuator spring 66 and move the actuator spring toward the card. However, the force away from the card 20 of the actuator spring 66 exceeds the force toward the card 20 of the make contact spring 74, and consequently the strap portion 72 when in engagement with the make contact spring 74 is determinative of the position thereof. In the normal condition of the actuator spring 66, the strap portion 72 maintains the make contact spring 74 so that the probe portion 75 is spaced from the card 20.

A flexible transfer contact spring 76 is mounted intermediate the make contact spring 74 and the card 20, and a rigid break contact spring 78 is mounted intermediate the transfer contact spring and the make contact spring. The transfer contact spring 76 is biased rearwardly toward the make contact spring 78, and thus when the transfer contact spring is in engagement with either the break contact spring or the make contact spring it tends to move them readwardly. However, the force of both the make contact spring 74 and the break contact spring 78 exceeds the force of the transfer contact spring 76, and therefore either the make contact spring or the break contact spring is determinative of the position of the transfer contact spring depending upon which of the two is in engagement with the transfer contact spring.

In the normal condition of the transfer contact spring 76, it rests against the break contact spring 78, and a first contact on the transfer contact spring engages a mating contact on the break contact spring to form a pair of normally closed contacts $C_1$, the subnumeral "1" being applied, for the purposes of clarity, to the normally closed contacts of all the switches associated with the cams. Furthermore, in the normal condition of the transfer contact spring 76, it is spaced from the make contact spring 74, and a second contact is spaced from a mating contact on the make contact spring to form a pair of normally open contacts $C_2$, the subnumeral "2" being applied to the normally open contacts of all the switches associated with the cams.

Figure 6:
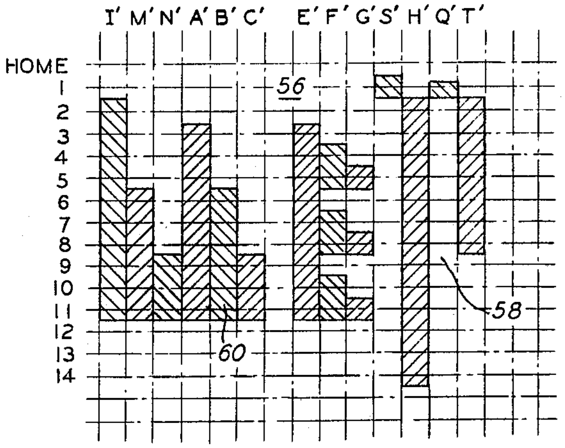
FIG. 6 is a development of the encoded drum of the automatic call transmitter, the operating portions of the individual cams comprising the encoded drum being designated by crosshatching.

Referring now to FIG. 6, there is shown a graphic development of each of the cams with the operating portions 60 thereof indicated by crosshatching, the development being overlaid by a grid to show the fifteen positions occupied by the cams with respect to the follower portions 68 (FIG. 5) of their associated switches during each complete revolution of the encoded drum 56. It is seen that the switch C is in a normal condition from a home position of the encoded drum 56, which is the position of the drum when all the switches are in their normal condition, through the eighth position of the drum, which position of the drum is depicted in FIG. 5. As the drum 56 and thereby the cam C′ is rotated from its eighth to its ninth position, which position is depicted in FIG. 7, first the gradually ascendng portion 62 and then the operating portion 60 moves into engagement with the follower portion 68 of the actuator spring 66. The actuator spring is deflected toward the card 20, and hence the make contact spring 74 is permitted to move toward the card.

If, as shown in FIG. 7, a disc 22 is presented to the probe portion 75 of the make contact spring 74, the forward motion of the make contact spring is arrested by the disc. The make contact spring 74 remains spaced from the transfer contact spring 76, whereby the normally open contacts $C_2$ remain open, and the transfer contact spring remains in engagement with the break contact spring 78, whereby the normally closed contacts $C_1$ remain closed. The further forward movement of the actuator spring 66 after the make contact spring 74 is arrested by the disc 22 only results in relative movement between the actuator spring and the make contact spring.

When the cam C′ moves from its eleventh to its twelfth position, first the rapidly descending portion 64 and then the nonoperating portion 58 is presented to the follower portion 68 of the actuator spring 66. The actuator spring is permitted to move rearwardly away from the card 20 and the strap portion 72 subsequently engages the make contact spring 74 and moves it rearwardly, withdrawing the probe portion 75 from the disc 22.

If, as shown in FIG. 8, a code hole 24 is presented to the probe portion 75 of the make contact spring 74, the probe portion moves into the code hole, permitting the make contact spring to move forwardly with the actuator spring 66. The forward motion of the make contact spring 74 brings it into engagement with the transfer contact spring 76 whereby the normally open contacts $C_2$ close, and immediately thereafter the make contact spring deflects the transfer contact spring from the break contact spring 78 whereby the normally closed contacts $C_1$ open. The contact springs maintain this position the entire time that the operating portion 60 of the cam C′ is presented to the follower portion 68 of the actuator spring 66.

When the cam C′ is moved from its eleventh to its twelfth position, first the rapidly descending portion 64 and then the nonoperating portion 58 is presented to the follower portion 68 of the actuator spring 66. The actuator spring 66 is permitted to move rearwardly away from the card 20, and the strap portion 72 moves the make contact spring 74 rearwardly. As the make contact spring 74 moves rearwardly, the probe portion 75 thereof is withdrawn from the code hole 24 of the card 20, and the transfer contact spring 76 is permitted to move into engagement with the break contact spring 78 whereby the normally closed contacts $C_1$ close. The rearward movement of the transfer contact spring 76 is thereby arrested, and as the make contact spring 74 continues to be drawn rearwardly by the actuator spring 66, the make contact spring is immediately thereafter separated from the transfer contact spring 76 whereby the normally open contacts $C_2$ open.

As exemplified by the interaction by the cam C′ and the switch C, the rotation of the drum 56 results in the cams I′, M′, N′, A′, B′, C′, E′, F′, G′, S′, H′, Q′, and T′ operating their associated switches in a particular sequence, which sequence is determined by the locations of the operating portions 60 of the cams with respect to each other. Generally, the sequence may be described as including five interdigital steps (positions home, one, twelve, thirteen, and fourteen) and ten pulsing steps (positions two through eleven). During the interdigital steps no pulses are ever transmitted out on the telephone line, this silent period being used to indicate to the central office that a digit has been completed and the pulses next transmited for a subsequent digit. During the pulsing steps, the pulses corresponding to a particular encoded digit are transmitted out on the telephone line.

The switches A, B, E, F, G, and S are all identical to the switch C except that the switches B, E, F, and G do not require a pair of normally closed contacts and therefore no connection is made to the break contact spring 78. The switches A, B, C, E, F, G, and S are located so that when a card 20 is inserted into the entryway 16, the probe portions 75 of the switches respectively extend into juxtaposition with the discs in the columns *a*, *b*, *c*, *e*, *f*, *g*, and *s*. It is seen that these switches are conditioned to be actuated in a particular sequence by their associated cams, but they are only actuated if a code hole 24 is presented thereto. Thus they may properly be described as code actuated sequence switches.

The switches I, M, N, H, Q, and T are the same as the switch C except that the make contact springs 74 thereof do not include a probe portion 75. As a result, these switches are operated in a particular sequence solely responsive to their associated cams and may therefore be properly described as sequence switches. The sequence switches I and T do not require a pair of normally open contacts and therefore no connection is made to the make contact spring 74, and the sequence switch H does not require a pair of normally closed contacts and therefore no connection is made to the break contact spring 78.

Referring again to FIG. 4, in addition to the encoded drum 56 described above, an escapement cam 80 is also fixedly mounted on the same shaft with the ratchet wheel 54. The escapement cam 80 actuates the escapement mechanism 40 so that as the encoded drum 56 moves from its fourteenth to its home position, the sprocket wheels 32 and 34 are permitted to advance the card 20 so as to present the next row of discs 22 (FIG. 6) to the probe portions 75 of the code actuated sequence switches A, B, C, E, F, G, and S.

Turning now to FIG. 3, if it becomes desirable to remove the card 20 once it has been inserted into the entryway 16, the release button 17 is depressed. The release button is mounted on a release plunger 81 that is slidably displaceable along a vertical plane between an upward and a downward position and is biased toward its upward position. The release plunger 81 includes a rearwardly extending leg (not shown), and when the plunger is moved to its downward position the leg actuates a release mechanism (not shown) to move a bar 82, shown in FIG. 5, into engagement with the make contact springs 74 of all the code actuated sequence switches and displaces them rearwardly so as to remove from the code holes 24 in the card 20 any of the probe portions 75 positioned therewithin.

The release plunger also includes an obliquely extending finger 83 that laterally displaces a release arm 84 when the plunger is moved to its downward position. The release arm 84 when so displaced disengages the escapement mechanism 40 and permits the motor spring 36 to rotate the sprocket wheels 32 and 34 in a rearward direction, thereby moving the card 20 out of the entryway 16.

As the sprocket wheels 32 and 34 rotate rearwardly, a tab 85 on the sprocket wheel 34 engages a vane 86 on a detent 88 that is rotatively mounted on the shaft 35. The sprocket wheel 34 rotates the detent 88 in a rearward direction, and immediately after the card 20 is moved to a threshold position in the entryway 16, at which point the teeth on the sprocket wheels 32 and 34 are respectively disengaged from the columns of sprocket holes 28 and 30 (FIG. 2), the vane 86 of the detent engages a stop 90 whereby the rearward rotation of the detent and the sprocket wheels is arrested.

Furthermore, just as the vane 86 of the detent 88 engages the stop 90, a vane 92 of the detent engages a shoulder on the start latch 45 and displaces the start latch forwardly. The start latch 45 in returning to its forward position operates the dial start switch DS to open the pair of normally open contacts $DS_2$ (FIG. 9) and then close the pair of normally closed contacts $DS_1$.

Figure 9:
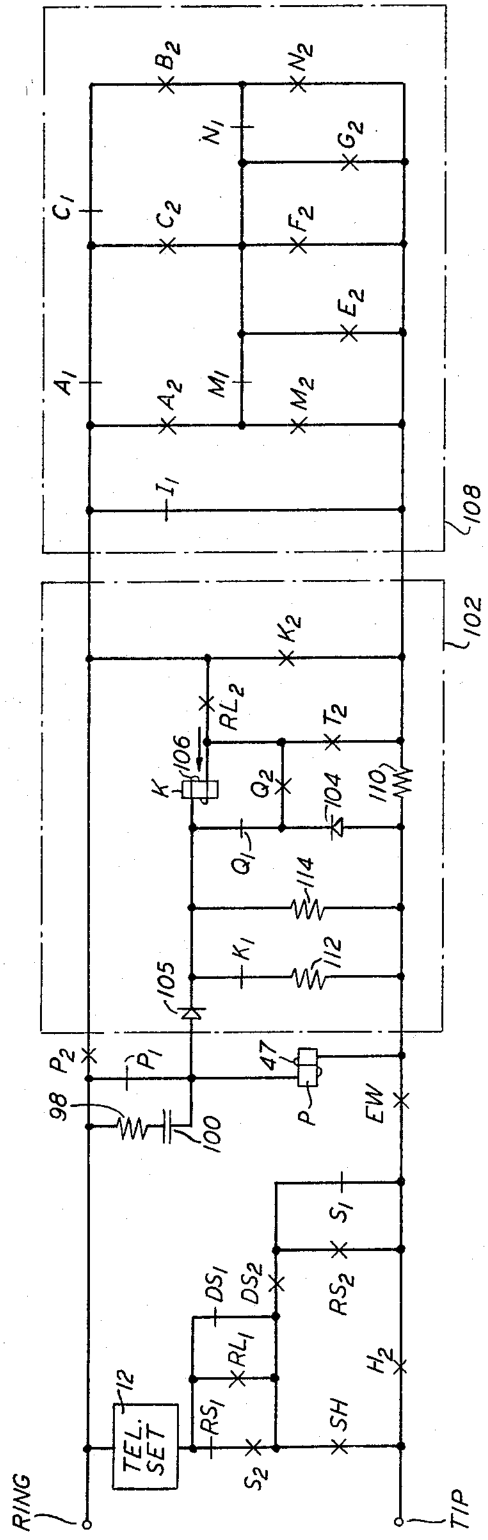
FIG. 9 is a schematic circuit diagram of the automatic call transmitter.

Finally, the release plunger 81 in moving from its upward to its downward position actuates a release switch RL (not shown) to close two pairs of normally open contacts $RL_1$ and $RL_2$ (FIG. 9). When the release button 17 is released and the release plunger 81 permitted to return to its upward position, the contacts $RL_1$ and $RL_2$ return to their normally open conditon and the release mechanism returns the bar 82 (FIG. 5) to its normal position forward of the make contact springs 74 of the code actuated sequence switches.

*Electrical description*

Turning now to FIG. 9, the telephone set 12 with which the call transmitter is associated is of the conventional type such as that disclosed in Patent 2,629,783 issued to H. F. Hopkins on February 24, 1953 and assigned to the assignee of this invention. The telephone set 12 is connected directly to the ring side of the telephone line and connectable to the tip side of the telephone line through the normally closed dial start contacts $DS_1$ and the normally open switchhook contacts SH, through the normally open release contacts $RL_1$ and the normally open switchhook contacts SH, or through the normally closed restart contacts $RS_1$, the normally open code actuated sequence contacts $S_2$, and the normally open switchhook contacts SH.

The coil 47 of the pulsing relay P of the call transmitter is connected in parallel with the telephone set 12, but usually only one or the other is connected across the telephone line. The coil 47 is connectable to the ring side of the telephone line through the normally closed pulsing contacts $P_1$, the pulsing contacts being protected by a resistor 98 and a capacitor 100 connected in parallel therewith. The coil 47 is connectable to the tip side of the telephone line through one of three paths. The first path is through the normally open entryway contacts EW, the normally closed code actuated sequence contacts $S_1$, the normally open dial start contacts $DS_2$, and the normally open switchhook contacts SH. The second path is through the normally open entryway contacts EW, the normally open restart contacts $RS_2$, the normally open dial start contacts $DS_2$, and the normally open switchhook contacts SH, and the third path is through the normally open entryway EW and the normally open sequence contacts $H_2$.

As set forth in the mechanical description, the energization of the coil 47 of the pulsing relay P results in the closing of the normally open contacts $P_2$ and then the opening of the normally closed contacts $P_1$. The connection between the coil 47 and the ring side of the telephone line is thereby interrupted and the coil is de-energized. Furthermore, if no alternative path is provided between the ring and tip sides of the telephone line, the interruption results in the transmission of a pulse out on the line. Upon the de-energization of the coil 47, the normally closed contacts $P_1$ close and then the normally open contacts $P_2$ open. The connection between the coil 47 and the ring side of the telephone line is thereby re-established and the coil is again energized.

The speed at which the pulsing relay P interrupts and re-establishes its connection with the ring side of the telephone line, or in other words, the speed at which the pulsing relay operates and releases, is determined by the mechanical forces acting upon the armature 48 (FIG. 4) of the relay and by a regulation network 102 connected in parallel with the coil 47. During the operate interval of the operation of the relay P, the regulation network 102 regulates the voltage across the coil 47 and provides a shunt path for excess current either through a blocking diode 104, the normally closed sequence contact $Q_1$ and a voltage regulating diode 105, or through the blocking diode 104, the normally open sequence contacts $Q_2$, a coil 106 of a regulating relay K, and the voltage regulating diode 105.

The regulating relay K is a bistable relay of the type disclosed in Patent 3,015,707 issued to G. E. Perreault on January 2, 1962 and assigned to the assignee of this invention, and it includes a pair of normally closed contacts $K_1$ and a pair of normally open contacts $K_2$. The contacts of the regulating relay K remain in their normal condition until current flows through the coil 106 in the opposite direction to the arrow shown in FIG. 9. When current flows through the coil 106 in such a direction, the normally closed contacts $K_1$ open and the normally open contacts $K_2$ close. The regulating contacts $K_1$ and $K_2$ then remain in this condition until current flows through the coil 106 in the direction of the arrow, whereupon the normally closed contacts $K_2$ open.

Current flows through the regulating relay K in the opposite direction to the arrow when the normally open sequence contacts $T_2$ are closed and a path is provided through a switching matrix 108, the switching matrix being connected across the coil 47 of the pulsing relay P by the closing of the normally open pulsing contacts $P_2$. When such conditions exist, current flows through the blocking diode 104, the closed normally closed sequence contacts $Q_1$, the coil 106 of the regulating relay K, and the closed normally open sequence contacts $T_2$, the current thereby shunting a load resistor 110 connected in series with the switching matrix 108. When the normally open sequence contacts $T_2$ are open, current is forced to flow through the load resistor 110 unless the normally open release contacts $RL_2$ are closed. It is seen that the normally open regulating contacts $K_2$ are connected in parallel with the switching matrix 108 and therefore provide a shunt around the switching matrix when closed by the operation of the regulating relay K.

During the release interval of the operation of the pulsing relay P, the collapsing field of the coil 47 generates a reverse current. The reverse current flows through either a slow release decay path consisting of the voltage regulating diode 105, the normally closed regulating contacts $K_1$, and a resistor 112, or a fast release decay path consisting of the voltage regulating diode 105 and a resistor 114. The resistor 112 is selected to have a much smaller resistance than the resistor 114, and therefore the reverse current normally flows through the slow release decay path which is designed to provide a stepping rate of ten pulses per second. Only when the regulating relay K is operated to open the normally closed contacts $K_1$ does the reverse current flow through the fast release decay path. The fast release decay path is designed to provide a stepping rate of 15.6 pulses per second.

The switching matrix 108 comprises the code operated sequence switches A, B, C, E, F, G, and S and the sequence switches I, M, and N. The normally closed sequence contacts $I_1$ are included in a first branch of the switching matrix, and the normally open sequence contacts $M_2$ are connected in series with the normally open code actuated sequence contacts $A_2$ to form a second branch of the matrix that is connected in parallel with the first branch. In addition, the normally open code actuated sequence contacts $F_2$ are connected in series with the normally open code actuated sequence contact $C_2$ to form a third branch that is connected in parallel with the second branch by the normally closed code actuated sequence contacts $A_1$, and the normally open sequence contacts $N_2$ are connected in series with the normally open code actuated sequence contacts $B_2$ to form a fourth branch of the switching matrix that is connected in parallel with the third branch by the normally closed code actuated sequence contacts $C_1$.

The normally open code actuated sequence contacts $E_2$ are connected in parallel with the normally open sequence contacts $M_2$ by the normally closed sequence contacts $M_1$, and the normally open code actuated sequence contacts $G_2$ are connected in parallel with the normally open sequence contacts $N_2$ by the normally closed sequence contacts $N_1$. Furthermore, the normally open code actuated sequence contacts $E_2$ and $G_2$ are both connected in parallel with the normally open code actuated sequence contacts $F_2$.

*Description of operation*

In the description of operation that follows, the description will relate to FIGS. 6 and 9 and to the figure set forth in parentheses, the figure in parentheses applying until a subsequent figure in parentheses is set forth. It will be assumed that the call transmitter is being used in an office served by a private branch exchange.

The subscriber begins the operation of the call transmitter by selecting the card 20 (FIG. 1) that is coded with the telephone number of the subscriber he wishes to call. For purposes of the present description it will be assumed that the encoded card 20 selected is the card shown in FIG. 2. The encoded card 20 is placed in the entryway 16, thereby displacing the actuator 42 (FIG. 3) to close the normally open contacts EW, and the card is inserted to its full height. The interaction between the columns of sprocket holes 28 and 30 (FIG. 2) in the encoded card 20 and the sprocket wheels 32 and 34 (FIG. 3) results in the winding up of the motor spring 36, and when the card is fully inserted, the card is positioned with the first row of discs 22 presented to the probe portions 75 (FIG. 5) of the code actuated sequence switches A, B, C, E, F, G, and S. As the digit nine is encoded in the first row of the card 20 (FIG. 2), code holes 24 are formed in the *c* and *g* columns.

The subscriber removes the handset 15 (FIG. 1) from the switchhook 14, thereby closing the normally open switchhook contacts SH, and the telephone set 12 is connected across the telephone line. A path is provided from the tip side of the telephone line through the closed normally open switchhook contacts SH, the closed normally closed dial start contacts $DS_1$, and the telephone set 12 to the ring side of the telephone line.

The subscriber listens for a dial tone, and hearing one, he depresses the start button 18 (FIG. 3). The depression of the start button 18 moves the start plunger 43 downwardly, and the flexible arm 44 thereof deflects the start latch 45 rearwardly. The start latch 45, in moving from its forward to its rearward position operates the dial start switch DS to close the normally open contacts $DS_2$ and then open the normally closed contacts $DS_1$. As a result, the telephone set 12 is disconnected from across the telephone line and the coil 47 of the pulsing relay P is connected across the telephone line. A path is provided from the tip side of the telephone line through the closed normally open switchhook contacts SH, the closed normally open dial start contacts $DS_2$, the closed normally closed code actuated sequence contacts $S_1$, the closed normally open entryway contacts EW, the coil 47, and the closed normally closed pulsing contacts $P_1$ to the ring side of the telephone line. The voltage regulating diode 105 in the regulating network 102 limits the voltage across the coil 47, and excess current flows through the blocking diode 104, the closed normally closed sequence contacts $Q_1$ and the voltage regulating diode 105.

The energization of the coil 47 (FIG. 4) of the pulsing relay P moves the armature 48 thereof to its downward position, and the downward motion of the armature moves the pawl 52 into engagement with the ratchet wheel 54 and rotates the ratchet wheel and thereby the encoded drum 56 through one-fifteenth of a revolution. As the encoded drum 56 moves from the home to the first position, the operating portion 60 of the cam S′ is presented to the follower portion 68 (FIG. 7) of the actuator spring 66 of the code actuated sequence switch S, deflecting the actuator spring forwardly and thereby permitting the make contact spring 74 to move forwardly. However, the forward motion of the make contact spring 74 of the code actuated sequence switch S is arrested by the engagement of the probe portion 75 thereof with the disc 22 in the first row of the *s* column (FIG. 2), and therefore the normally closed contacts $S_1$ remain closed and the normally open contacts $S_2$ remain open.

In addition, the movement of the encoded drum 56 from the home to the first position presents the operating portion 60 of the cam Q′ to the follower portion 68 (FIG. 8) of the actuator spring 66 of the sequence switch Q. Because the make contact springs 74 of the sequence switches do not include a probe portion 75, the make contact spring 74 of the sequence switch Q engages the transfer contact spring 76, closing the normally open contacts $Q_2$, and then deflects the transfer spring from the break contact spring 78, opening the normally closed contacts $Q_1$.

The energization of the pulsing relay P also results in the operation of the pulsing switch (not shown) to sequentially close the normally open contacts $P_2$ and then open the normally closed contacts $P_1$. The closing of the normally open pulsing contacts $P_2$ provides a path from the tip side of the telephone line through the closed normally open switchhook contacts SH, the closed normally open dial start contacts $DS_2$, the closed normally closed code actuated sequence contacts $S_1$, the closed normally open entryway contacts EW, the load resistor 110, the closed normally closed sequence contacts $I_1$, and the closed normally open pulsing contacts $P_2$ to the ring side of the telephone line. The subsequent opening of the normally closed pulsing contacts $P_1$ interrupts the connection of the coil 47 across the telephone line. Since the path between the tip and the ring side of the telephone line is maintained, no pulse is transmitted out on the telephone line.

The disconnection of the coil 47 of the pulsing relay P from the telephone line results in its de-energization, and the collapsing field of the coil generates a decay current that flows through the slow release decay path of the voltage regulating diode 105, the closed normally closed regulating contacts $K_1$, and the resistor 112. As a result, the relay P operates at its normal rate of ten operations per second. In addition, the de-energization of the coil 47 permits the spring member 50 (FIG. 4) to move the armature 48 to its upward position, and the armature in moving to its upward position operates the pulsing switch (not shown) to sequentially close the normally closed contacts $P_1$ and then open the normally open contacts $P_2$. The coil 47 is thereby reconnected across the telephone line and energized again.

During this second energization of the coil 47, the excess line current, due to the operation of the sequence switch Q, flows through the blocking diode 104, the closed normally open sequence contacts $Q_2$, the coil 106 of the regulating relay K, and the voltage regulating diode 105. Since the current flows through the regulating relay K in the direction of the arrow, the regulating contacts $K_1$ remain in their normal position.

As before, the energization of the coil 47 of the pulsing relay P results in the rotation of the encoded drum 56 through one-fifteenth of a revolution and the sequential closing of the normally open pulsing contacts $P_2$ and the opening of the normally closed pulsing contacts $P_1$. The rotation of the encoded drum 56 moves the drum from the first to the second position, whereupon the operating portions 60 of the cams I′, H′, and T′ respectively actuate the sequence switches I, H, and T, and the nonoperating portions 58 of the cams S′ and Q′ respectively permit the code actuated sequence switch S and the sequence switch Q to return to their normal condition.

The return of the code actuated sequence switch S to its normal condition results in no change in contacts $S_1$ and $S_2$ thereof. The return of the sequence switch Q to its normal condition closes the normally closed contacts $Q_1$ and opens the normally open contacts $Q_2$ thereof and the actuation of the sequence switch T closes the normally open contacts $T_2$ thereof to connect the coil 106 of the regulating relay K in a shunt path around the load resistor 110.

The actuation of the sequence switch I opens the normally closed contacts I thereof to open the path through the switching matrix 108, and thus with the closing of the normally open pulsing contacts $P_2$ and the opening of the normally closed pulsing contacts $P_1$ no path is provided from the tip to the ring sides of the telephone line. Consequently, the telephone line is interrupted and a pulse is transmitted thereover.

Finally, the actuation of the sequence switch H closes the normally open contacts $H_2$ thereof to provide a path that shunts the normally open switchhook contacts SH, the normally open dial start contacts $DS_2$, the normally open restart contacts $RS_2$, and the normally closed code actuated sequence contacts $S_1$. Thus, upon the subsequent closing of the normally closed pulsing contacts $P_1$, current flows from the tip side of the telephone line through the closed normally open sequence contacts $H_2$, the closed normally open entryway contacts EW, the coil 47 of the pulsing relay P, and the closed normally closed pulsing contacts $P_1$ to the ring side of the telephone line to energize the coil 47 a third time.

On the third energization of the coil 47 of the pulsing relay P, the excess current again flows through the blocking diode 104, the closed normally closed sequence contacts $Q_1$, and the voltage regulating diode 105, and the encoded drum 56 is advanced to its third position. The operating portions 60 of the cams A' and E' respectively condition the code actuated sequence switches A and E for actuation, but as a code hole 24 (FIG. 2) does not appear in either the *a* or the *e* columns of the first row of the card 20, neither switch is actuated. No path is provided between the tip and ring sides of the telephone line, and a second pulse is transmitted out on the telephone line.

The fourth energization of the coil 47 of the pulsing relay P advances the encoded drum 56 to its fourth position, and the operating portion 60 of the cam F' conditions the code actuated sequence switch F for operation. However, since no code hole 24 appears in the *f* column of the first row of the card 20, the switch F is not operated. No path is provided through the switching matrix 108, and a third pulse is transmitted.

In the fifth position of the encoded drum 56, the code actuated sequence switch G, responsive to the operating portion 60 of the cam G' and the code hole 24 in the *g* column of the first row of the card 20, is actuated to close the normally open contacts $G_2$ thereof. But still no path is provided through the switching matrix 108 and a fourth pulse is transmitted.

In the sixth position of the drum 56, the cam M' actuates the sequence switch M to close the normally open contacts $M_2$ and open the normally closed contacts $M_1$ thereof, the cam B' conditions the code actuated sequence switch B for operation, and the cams F' and G' respectively permit the code actuated sequence switches F and G to return to their normal condition whereupon the normally open code actuated sequence contacts $G_2$ open.

In the seventh postion of the drum 56, the cam F' conditions code actuated sequence switch F for operation a second time.

In the eighth position of the drum 56, the code actuated sequence switch G, responsive to the cam G' and the code hole 24 in the *g* column of the first row of the card 20, is actuated a second time to close the normally open contacts $G_2$ thereof.

In the ninth position of the drum 56, the cam N' actuates the sequence switch N to close the normally open contacts $N_2$ and open the normally open contacts $N_1$ thereof and the cam T' returns the sequence switch T to its normal condition to open the normally open contacts $T_2$ thereof and thereby open the shunt path around the load resistor 110. In addition, the code actuated sequence switch C, responsive to the cam C' and the code hole 24 in the *c* column of the first row of the card 20, is actuated to close the normally open contacts $C_2$ and open the normally closed contacts $C_1$ thereof, while at the same time, the cams F' and G' respectively return code actuated sequence switches F and G to their normal condition to again open the normally open contacts $G_2$.

In the tenth position of the drum 56, the cam F' conditions code actuated sequence switch F for operation a third time.

As no path is provided through the switching matrix 108 in the sixth, seventh, eighth, ninth, and tenth positions of the encoded drum 56, a fifth, sixth, seventh, eighth, and ninth pulse is transmitted out on the telephone line.

Finally, in the eleventh position of the encoded drum 56, the code actuated sequence switch G, responsive to the cam G' and the code hole 24 in the *g* column of the first row of the card 20, is actuated a third time to close the normally open contacts $G_2$ thereof, and a path is provided from the tip side of the telephone line through the closed normally open sequence contacts $H_2$, the closed normally open entryway contacts EW, the load resistor 110, the closed normally open code actuated sequence contacts $G_2$, the closed normally open code actuated sequence contacts $C_2$, the closed normally closed code actuated sequence contacts $A_1$, and the closed normally open pulsing contacts $P_2$ to the ring side of the telephone line. The telephone line is therefore not interrupted and no pulse is transmitted to the central office.

As the encoded drum 56 advances to its twelfth position, the cams I', M', N', A', B', C', E', F', and G' all return their associated switches to their normal condition, and thus all the contacts in the switching matrix 108 return to their normal condition. Consequently, a path is provided from the tip side of the telephone line through the closed normally open sequence contacts $H_2$, the closed normally open entryway contacts EW, the load resistor 110, the closed normally closed sequence contacts $I_1$, and the closed normally open pulsing contacts $P_2$ to the ring side of the telephone line, and no pulse is transmitted out on the telephone line.

The sequence switch I remains in its normal condition as the encoded drum 56 is moved to its thirteenth, fourteenth, and home positions, and thus the path through the switching matrix is maintained and no interruptions of the telephone line occur in these positions. There is, however, a change in the path when the encoded drum 56 returns to the home position whereupon the cam H' returns the sequence switch H to its normal condition. The normally open contacts $H_2$ of the sequence switch H open and the path is then from the tip side of the telephone line through the closed normally open switchhook contacts SH, the closed normally open dial start contacts $DS_2$, the closed normally closed code actuated sequence contacts $S_1$, the closed normally open entryway contacts EW, the load resistor 110, the closed normally closed sequence contacts $I_1$, and the closed normally open pulsing contacts $P_2$ to the ring side of the telephone line.

As the encoded drum 56 is moved back to the home position, the escapement cam 80 (FIG. 4) actuates the escapement mechanism 40 to permit the gear 38 (FIG. 3) and thereby the sprocket wheels 32 and 34 to rotate in a rearward direction through the distance necessary to move the second row of discs 22 (FIG. 2) of the card 20 into juxtaposition with the probe portions 75 (FIG. 5) of the code actuated sequence switches A, B, C, E, F, G, and S. The digit two is encoded in the second row of the card 20 (FIG. 2) and therefore code holes 24 appear in the *a* and *f* columns.

In addition, a code hole 24 appears in the *s* or stop column of the second row, and thus upon the movement of the encoded drum 56 from the home to the first position, the code actuated sequence switch S, responsive to the operating portion 60 of the cam S' and the code hole 24 in the *s* column, is actuated to sequentially close the normally open contacts $S_2$ and then open the normally closed contacts $S_1$ thereof. The closing of the normally open code actuated sequence contacts $S_2$ connects the telephone set 12 across the telephone line, a path being provided from the tip side of the line through the closed normally open switchhook contacts SH, the closed normally open code actuated sequence contacts $S_2$, the closed normally closed restart contacts $RS_1$, and the telephone set to the ring side of the line. The opening of the normally closed code actuated sequence contacts $S_1$ disconnects the pulsing relay P from the telephone line, stopping the operation of the call transmitter.

The movement of the encoded drum 56 from the home to the first position also results in the cam Q' actuating the sequence switch Q to close the normally open contacts $Q_2$ and opening the normally closed contacts $Q_1$ thereof.

Assuming that the purpose of the first digit was to gain access to an outside trunk line, the subscriber listens for a dial tone, indicating that the trunk line is available. Hearing a dial tone, the subscriber depresses the start button 18 (FIG. 3), moving the start plunger 43 to its downward position and thereby operating the restart switch (not shown) to sequentially close the normally open contacts $RS_2$ and then open the normally closed contacts $RS_1$ thereof. Consequently, the pulsing relay P is reconnected across the telephone line, a path being provided from the tip side of the line through the closed normally open switchhook contacts SH, the closed normally open dial start contacts $DS_2$, the closed normally open restart contacts $RS_2$, the closed normally open entryway contacts EW, the coil 47 of the pulsing relay P, and the closed normally closed pulsing contacts $P_1$ to the ring side of the telephone line; and then the telephone set 12 is disconnected from the telephone line.

The call transmitter commences operation again, and the pulsing relay P moves the encoded drum 56 from the first to the second position, whereupon the cams S' and Q' respectively permit the code actuated sequence switch S and the sequence switch Q to return to their normal condition and the cams I', H', and T' respectively actuate the sequence switches I, H, and T. The return of the code actuated sequence switch S to its normal condition closes the normally closed contacts $S_1$ and opens the normally open contacts $S_2$ thereof, and thus when the subscriber removes his finger from the start button 18 and thereby permits the normally closed restart contacts $RS_1$ to close and the normally open restart contacts $RS_2$ to open, the pulsing relay P continues to be connected across the telephone line and the telephone set 12 continues to be disconnected from the telephone line.

As before, the return of the sequence switch Q to its normal condition closes the normally closed contacts $Q_1$ and opens the normally open contacts $Q_2$ thereof and the actuation of the sequence switch T closes the normally open contacts $T_2$ thereof to connect the coil 106 of the regulating relay K in a shunt path around the load resistor 110. The actuation of the sequence switch H closes the normally open contacts $H_2$ thereof to provide a path that shunts the normally open switchhook contacts SH, the normally open dial start contacts $DS_2$, the normally open restart contacts $RS_2$, and the normally closed code actuated sequence contacts $S_1$; and the actuation of the sequence switch I opens the normally closed contacts $I_2$ thereof to open the path through the switching matrix 108. Thus, with the closing of the normally open pulsing contacts $P_2$ and the opening of the normally closed pulsing contacts $P_1$ no path is provided from the tip to the ring side of the telephone line. Consequently, the telephone line is interrupted and a first pulse is transmitted thereover.

Upon the advancement of the encoded drum 56 to the third position, the cams A' and E' respectively condition the code actuated sequence switches A and E for actuation. Since a code hole 24 (FIG. 2) appears in the *a* column and not in the *e* column of the second row of the card 20, the code actuated sequence switch A is actuated to open the normally closed contacts $A_1$ and close the normally open contacts $A_2$ thereof while the code actuated sequence switch E is not actuated. Consequently no path is provided between the tip and ring side of the telephone line, and a second pulse is transmitted out on the line.

In the fourth position of the encoded drum 56, the code actuated sequence switch F, responsive to the cam F' and the code hole 24 in the *f* column of the second row of the card 20, is operated to close the normally open contacts $F_2$ thereof. Thus, with the closing of the normally open pulsing contacts $P_2$ and the opening of the normally closed pulsing contacts $P_1$, a path is provided from the tip side of the telephone line through the closed normally open sequence contacts $H_2$, the closed normally open entryway contacts EW, the blocking diode 104, the closed normally closed sequence contacts $Q_1$, the coil 106 of the regulating relay K, the closed normally open sequence contacts $T_2$, the closed normally open code actuated sequence contacts $F_2$, the closed normally closed sequence contacts $M_1$, the closed normally open code actuated sequence contacts $A_2$, and the closed normally open pulsing contacts $P_2$ to the ring side of the telephone line. The telephone line is therefore not interrupted and no pulse is transmitted to the central office.

In addition, since there is current flow through the coil 106 of the regulating relay K in the opposite direction to the arrow, the regulating relay K operates to open the normally closed contacts $K_1$ thereof. Consequently, the reverse current generated by the collapsing field of the coil 47 of the pulsing relay P is forced to flow through the fast release decay path of the voltage regulating diode 105 and the resistor 114, and the pulsing relay commences to operate at its fast rate.

In the fifth position of the encoded drum 56, the code actuated sequence switches A and F remain actuated, and therefore the same path is provided through switching matrix 108 and no pulse is transmitted out on the telephone line.

In the sixth position of the drum 56, the cam F' permits the code actuated sequence switch F to return to its normal condition whereupon the normally open contacts $F_2$ open and the cam M' actuates the sequence switch M to close the normally open contacts $M_2$ and open the normally closed contacts $M_1$ thereof. A path is thereby provided from the tip side of the telephone line through the closed normally open sequence contacts $H_2$, the closed normally open entryway contacts EW, the blocking diode 104, the closed normally closed sequence contacts $Q_1$, the coil 106 of the regulating relay K, the closed normally open sequence contacts $T_2$, the closed normally open sequence contacts $M_2$, the closed normally open code actuated sequence contacts $A_2$, and the closed normally open pulsing contacts $P_2$ to the ring side of the telephone line, and again no pulse is transmitted out on the telephone line.

The cams M' and A' respectively maintain the sequence switch M and the code actuated sequence switch A in an actuated condition in the seventh through eleventh positions of the encoded drum 56, and therefore in each of these positions the same path is provided through the switching matrix 108 and no pulses are transmitted Out on the telephone line. A change in the path between the tip and ring sides of the telephone lines does, however, occur in the ninth position when the cam T' permits the sequence switch T to return to its normal condition. The normally open sequence contacts $T_2$ open and therefore in the ninth through eleventh positions current flows through the load resistor 110 rather than through the blocking diode 104, the normally closed sequence contacts $Q_1$, the coil 106 of the regulating relay K, and the normally open sequence contacts $T_2$.

In the twelfth through the home positions, all the switches in the switching matrix 108 again return to their normal condition, and hence no pulses are transmitted out on the telephone line in these positions since a path is provided from the tip side of the telephone line through the closed normally open sequence contacts $H_2$, the closed normally open entryway contacts EW, the load resistor 110, the closed normally closed sequence contacts $I_1$, and the closed normally open pulsing contacts $P_2$ to the ring side of the telephone line.

As the encoded drum 56 advances to the home position the escapement cam 80 (FIG. 4) again actuates the escapement mechanism 40 to permit the sprocket wheels 32 and 34 (FIG. 3) to advance the card 20 (FIG. 2) to present the third row of discs 22 to the probe portions 75 (FIG. 5) of the code actuated sequence switches A, B, C, E, F, G, and S, and the call transmitter commences to transmit the third digit of the telephone number.

In transmitting the third and subsequent digits, the call transmitter repeats its basic pattern of operation for each digit. In the first, twelfth, thirteenth, fourteenth, and home positions of the encoded drum 56, an interdigital period is provided during which no pulses are transmitted out on the telephone line, there being a path through the switching matrix 108 through the closed normally closed sequence contacts $I_1$. In the second through eleventh positions of the encoded drum 56, pulses are transmitted out on the telephone line until a path is provided through the switching matrix 108, and once such a path is provided it is maintained through the balance of these positions.

If seven or less pulses are transmitted, that is, if a path is provided through the switching matrix 108 while the normally open sequence contact $T_2$ are closed, the regulating relay K is operated to open the normally closed contacts $K_1$ thereof and place the call transmitter into high speed operation. The high speed operation continues until the encoded drum 56 returns to the first position whereupon the cam Q′ actuates the sequence switch Q to close the normally open contacts $Q_2$ and open the normally closed contacts $Q_1$ thereof. The subsequent energization of the coil 47 of the pulsing relay P results in the excess current flowing through the blocking diode 104, the closed normally open sequence contacts $Q_2$, the coil 106 of the regulating relay K, and the voltage regulating diode 105, and as the current flows through the coil 106 in the direction of the arrow, the relay is operated to close the normally closed contacts $K_1$ and thereby reinstates the slow speed operation. If eight or more pulses are transmitted, that is, if a path is provided through the switching matrix 108 while the normally open sequence contacts $T_2$ are open, the call transmitter continues to operate at the slow speed. In the case of the digit zero, no path is provided through the switching matrix 108 and consequently pulses are transmitted in each of the third through eleventh positions of the encoded drum 56.

After transmitting the last digit of the telephone number, the card 20 (FIG. 2) is moved up one row and, as described above, the coding of the *s* or stop column results in the operation of the call transmitter being terminated and the telephone set 12 being once more connected across the telephone line. While waiting for the connection to be made to the called party, the subscriber depresses the release button 17 (FIG. 3), thereby moving the release plunger 81 to its downward position.

The movement of the release plunger 81 to its downward position operates the release switch (not shown) to close the normally open contacts $RL_1$ and $RL_2$ thereof. At the same time, the movement of the release plunger 81 to its downward position actuates a release mechanism (not shown) to move the bar 82 (FIG. 8) rearwardly. The bar 82 in moving rearwardly displaces the make contact spring 74 of the code actuated sequence switch S rearwardly, withdrawing the probe portion 75 thereof from the code hole 24 (FIG. 2) in the *s* column of the card 20. In addition, the rearward movement of the make contact spring 74 permits the transfer contact spring 76 to move forwardly into engagement with the break contact spring 78, closing the normally closed contacts $S_1$, after which the make contact spring separates from the transfer contact spring, opening the normally open contacts $S_2$.

As a result, both the telephone set 12 and the call transmitter are connected across the telephone line. A path is provided from the tip side of the telephone line through the closed normally open switchhook contacts SH, the closed normally open release contacts $RL_1$, and the telephone set 12 to the ring side of the telephone line; and a path is provided from the tip side of the telephone line through the closed normally open switchhook contacts SH, the closed normally open dial start contacts $DS_2$, the closed normally closed code actuated sequence contacts $S_1$, the closed normally open entryway contacts EW, the coil 47 of the pulsing relay P, and the normally closed pulsing contacts $P_1$ to the ring side of the telephone line.

The energized pulsing relay P moves the encoded drum 56 to the third position and then closes the normally open pulsing contacts $P_2$ and opens the normally closed pulsing contacts $P_1$. A path is then provided from the tip side of the telephone line through the closed normally open sequence contacts $H_2$, the closed normally open entryway contacts EW, the blocking diode 104, the closed normally closed sequence contacts $Q_1$, the coil 106 of the regulating relay K, the closed normally open release contacts $RL_2$, and the closed normally open pulsing contacts $P_2$ to the ring side of the telephone line. Current flows through the coil 106 of the regulating relay K in the opposite direction to the arrow, and the relay is operated to open the normally closed contacts $K_1$ and close the normally open contacts $K_2$ thereof. The call transmitter thereby commences to operate at high speed.

At the same time that the call transmitter commences its operation, the downward movement of the release plunger 81 causes the finger 83 thereof (FIG. 3) to laterally displace the release arm 84, thereby disengaging the escapement mechanism 40 and permitting the motor spring 36 to rotate the sprocket wheels 32 and 34 to move the card 20 out of the entryway 16. The sprocket wheels 32 and 34 move the card 20 to a threshold position in the entryway 16, at which point the sprocket wheels are disengaged from the columns of sprocket holes 28 and 30 (FIG. 2) in the card, and the tab 85 (FIG. 3) of the sprocket wheel 34 moves the vane 86 of the detent 88 against the stop 90. The stop 90 arrests the vane 86 and the vane in turn arrests the rotation of the sprocket wheels 32 and 34. The movement of the vane 86 against the stop 90 moves the vane 92 into engagement with a shoulder on the start latch 45 and moves the latch to its forward position, thereby operating the dial start switch DS to close the normally closed contacts $DS_1$ and open the normally open contacts $DS_2$ thereof.

Thus, when the subscriber removes his finger from the release button 17 and the release plunger 81 returns to its upward position, opening the normally open contacts $RL_1$ and $RL_2$ thereof, the telephone set 12 continues to be connected across the telephone line, a path being provided from the tip side of the line through the closed normally open switchhook contacts SH, the closed normally closed dial start contacts $DS_1$ and the telephone set 12 to the ring side of the telephone line. The call transmitter also continues to be connected across the telephone line as long as the card 20 is permitted to remain in the entryway 16 and thereby maintains the entryway contacts EW closed, a path being provided from the tip side of the line through the closed normally open sequence contacts $H_2$, the closed normally open entryway contacts EW, the coil 47 of the pulsing relay P and the normally closed pulsing contacts $P_1$ to the ring side of the line. Due to the closed normally open regulating contacts $K_2$, no pulses are transmitted out on the telephone line, and when the encoded drum 56 returns to its home position and the normally open sequence contacts $H_2$ open, the operation of the call transmitter ceases.

It is seen that the normally open sequence contacts $H_2$ tend to assure that even if the subscriber decides to terminate the operation of the call transmitter by returning the handset 15 to the switchhook 14, the call transmitter continues to receive power from the telephone line until the encoded drum 56 is returned to the home position. However, it is also seen that as the normally open entryway contacts EW are connected in series with the normally open sequence contacts $H_2$, the operation of the call transmitter can be terminated at any time by removing the card 20 from the entryway 16 and thereby permitting the entryway contacts EW to open. Thus the entryway contacts EW assure that if the call transmitter malfunctions or becomes disabled in a manner where it continues to draw current from the telephone line, it can be automatically disconnected from the telephone line. Of course in moving the card 20 to a threshold position in the entryway 16, the dial start switch DS is operated to close the normally closed contacts $DS_1$ thereof, and this results in the telephone set 12 being connected across the telephone line. The combination of the dial start switch DS, the sequence contacts $H_2$, and the entryway contacts EW therefore provides fail safe operation.

While the invention has been described in terms of a call transmitter for transmitting signals corresponding to the digits of a telephone number, it is not limited thereto. The invention may be employed in other types of communication systems and may be employed to transmit information other than that identifying a subscriber to the communication system. Thus the term "call transmitter" is intended to encompass code transmitters, and the term "digit" is intended to encompass any bit of information.

What is claimed is:

1. A call transmitter employing a code bearing member having a plurality of digits encoded thereon, the call transmitter comprising:
- a plurality of switches;
- means associated with each switch for detecting the coding on the code bearing member, the detecting means being normally spaced from the code bearing member;
- means for moving individual ones of the detecting means toward the code bearing member in a particular detecting sequence and actuating the individual switches responsive to the detection of coding by the detecting means associated therewith; and
- means under the control of the actuated switches for generating signals corresponding to the encoded digits and transmitting the signals out on a communication line.

2. A call transmitter employing a code bearing member having a plurality of digits identifying a subscriber to a communication system encoded thereon, the call transmitter comprising:
- a plurality of switches;
- means associated with each switch for detecting the coding on the code bearing member, the detecting means being normally spaced from the code bearing member;
- means for advancing individual ones of the detecting means toward the code bearing member in a particular detecting sequence, each advanced detecting means moving to a first position when no coding is detected thereby and moving to a second position when coding is detected thereby, the switch with which each detecting means is associated being actuated responsive to the movement of the detecting means to the second position; and
- means under the control of the actuated switches for generating signals corresponding to the encoded digits and transmitting the signals out on a communication line.

3. A call transmitter employing a code bearing member having a plurality of digits identifying a subscriber to a communication system encoded thereon, the call transmitter comprising:
- a plurality of switches;
- means associated with each switch for detecting the coding on the code bearing member, each detecting means comprising a first element biased toward and extending into juxtaposition with the code bearing member, the first element being normally spaced from the code bearing member;
- means for advancing the first elements of individual ones of the detecting means toward the code bearing member in a particular detecting sequence, each advanced first element moving to a first position when no coding is detected thereby and moving to a second position when coding is detected thereby, the switch with which each detecting means is associated being actuated responsive to the movement of the first element the second position; and
- means under the control of the actuated switches for generating signals corresponding to the encoded digits and transmitting the signals out on a communication line.

4. A call transmitter as in claim 3 wherein each detecting means further comprises a second element extending intermediate the first element and the code bearing member and biased away from the code bearing member, the bias of the second element exceeding the bias of the first element, and the second element normally maintaining the first element spaced from the code bearing member.

5. A call transmitter as in claim 4 wherein the moving means includes means for moving the second element toward the code bearing member, whereby the first element is permitted to move toward the code bearing member.

6. A call transmitter as in claim 4 wherein the moving means comprises a plurality of cams, each cam being associated with an individual second element of the detecting means, each cam including an operating portion of large radius for moving the second element toward the code bearing member and permitting the first element to move toward the code bearing member, and each cam including a nonoperating portion of small radius for permitting the second element to move away from the code bearing member and move the first element away from the code bearing member.

7. A call transmitter as in claim 6 wherein each switch comprises a first contact spring positioned intermediate the first element and the code bearing member and a second contact spring positioned intermediate the first contact spring and the first element, the first contact spring extending into juxtaposition with both the second contact spring and the first element.

8. A call transmitter employing a code bearing member having a plurality of digits encoded thereon, the call transmitter comprising:
- a plurality of switches;
- means associated with each switch for detecting the coding on the code bearing member, the detecting means being normally spaced from the code bearing member;
- means for moving the individual detecting means toward the code bearing member in a particular detecting sequence, each detecting means moving to a first position when no coding is detected thereby and moving to a second position when coding is detected thereby, the switch with which each detecting means is associated being actuated responsive to the movement of the detecting means to the second position;
- a switching matrix comprising the plurality of switches, the actuation of two of the switches providing a path through the matrix that once provided is maintained throughout the remainder of the detecting sequence; and
- means for transmitting signals out on a communication line when no path is provided through the switching matrix.

9. A call transmitter employing a code bearing member having a plurality of digits identifying a subscriber to a telephone system encoded thereon, the call transmitter comprising:
- a plurality of switches A, B, C, D, E, F, G and H, the switches A, B, C, and D including normally closed and normally open contacts and the switches E F, G, and H including normally open contacts;
- means associated with each of the switches C, D, E, F, G, and H for detecting the coding on the code bearing member, the detecting means being normally spaced from the code bearing member;
- means for moving the individual detecting means toward the code bearing member in a particular sequence and actuating the individual switches C, D, E, F, G, and H responsive to the detection of coding by the detecting means associated therewith;
- means for actuating the switches A and B in a particular sequence;
- a switching matrix including switches A, B, C, D, E, F, G, and H, the normally open contacts of the switch A being connected in series with the normally open contacts of the switch C to form a first branch of the matrix, the normally open contacts of the switches D and E being connected in series to form a second branch that is connected in parallel with the first branch by the normally closed contacts of the switch C, the normally open contacts of the switch B being connected in series with the normally open contacts of the switch F to form a third branch that is connected in parallel with the second branch by the normally closed contacts of the switch D, the normally open contacts of the switch G being connected in parallel with the normally open contacts of the switch A by the normally closed contacts of the switch A, the normally open contacts of the switch H being connected in parallel with the normally open contacts of the switch B by the normally closed contacts of the switch B, and the normally open contacts of the switches G and H both being connected in parallel with the normally open contacts of the switch E; and means for transmitting pulses out on a telephone line when no path is provided through the switching matrix.

10. A call transmitter as in claim 9 wherein the means for transmitting pulses comprises a relay having a winding and normally closed contacts in series with the winding adapted to connect the winding across a telephone line whereby the relay is energized, the relay further having normally open contacts in series with the switching matrix adapted to connect the switching matrix across the telephone line, the relay when energized closing the normally open contacts whereby the switching matrix is connected across the telephone line and then opening the normally open contacts whereby the connection of the winding across the telephone line is interrupted and the relay is de-energized, the relay when de-energized closing the normally closed contacts whereby the connection of the winding across the telephone line is re-made and then opening the normally open contacts, whereby the connection of the switching matrix across the telephone line is interrupted.

11. A call transmitter as in claim 10 further including a timing circuit in parallel with the winding of the relay, the timing circuit including a low speed portion in parallel with a high speed portion and a switch I actuated in a particular sequence, the switch I having normally open contacts, the low speed portion normally controlling the speed of operation of the relay but the low speed portion being disconnected responsive to the provision of a path through the switching matrix during the actuation of the switch I, whereby the high speed portion controls the speed of operation of the relay.

12. A call transmitter as in claim 11 wherein the timing circuit includes a control section comprising a bistable relay and the sequence switch I in series, the control relay having normally closed contacts in series with the low speed portion, the provision of a path through the switching matrix during the actuation of the sequence switch I energizing the control relay to open the normally closed contacts thereof and thereby disconnecting the low speed portion of the timing circuit.

13. A call transmitter as in claim 12 wherein the timing circuit further includes a switch J actuated in a particular sequence, the switch J having normally closed contacts and normally open contacts, the actuation of the sequence switch J energizing the control relay to close the normally closed contacts thereof.

References Cited by the Examiner

UNITED STATES PATENTS

| | | | |
|---|---|---|---|
| 2,813,931 | 11/1957 | De Forest | 179—90.1 |
| 3,078,349 | 2/1963 | Sasaki | 179—90.2 |
| 3,129,295 | 4/1964 | Crommen | 179—90.2 |

KATHLEEN H. CLAFFY, *Primary Examiner.*

J. W. JOHNSON, *Assistant Examiner.*